United States Patent [19]
Bell et al.

[11] 3,922,374
[45] Nov. 25, 1975

[54] PREPARATION OF SIMULATED CHEESE

[75] Inventors: Richard J. Bell, Sherman; John D. Wynn, Plano; George T. Denton, Plano; Ralph E. Sand, Plano; David L. Cornelius, Jr., Dallas, all of Tex.

[73] Assignee: Anderson, Clayton & Co., Houston, Tex.

[22] Filed: Aug. 26, 1974

[21] Appl. No.: 500,244

Related U.S. Application Data

[63] Continuation-in-part of Ser. No. 344,640, March 26, 1973, abandoned.

[52] U.S. Cl. ............... 426/582; 426/519; 426/585; 426/656
[51] Int. Cl.² .......................................... A23C 19/00
[58] Field of Search ........... 426/188, 189, 356, 361, 426/519, 363, 582, 585, 656

[56] References Cited
UNITED STATES PATENTS
3,359,116   12/1967   Little ............................. 426/361 X
3,397,995   8/1968   Elenbogen ........................ 426/189

FOREIGN PATENTS OR APPLICATIONS
811,611   3/1974   Belgium

OTHER PUBLICATIONS
Kosikomski F., Cheese and Fermented Milk Foods, Published by the Author, Cornell University, N.Y. 1966, pp. 295, 296 and 302.
Hall et al., Drying Milk and Milk Products, The Ari Publishing Co. Inc., Westport, Conn. 1966, pp. 182–186.

*Primary Examiner*—David M. Naff
*Attorney, Agent, or Firm*—Fulbright & Jaworski

[57] ABSTRACT

A food resembling pasta filata, cheddar or pasteurized process cheese is produced by blending water, certain acids, fat, casein and calcium hydroxide and/or sodium hydroxide to form calcium caseinate and/or sodium caseinate in situ. To produce the food as a substantially gas-free homogeneous blend of the ingredients, in situ formation is carried out under high shear mixing and subatmospheric pressure.

9 Claims, 1 Drawing Figure

U.S. Patent  Nov. 25, 1975  3,922,374
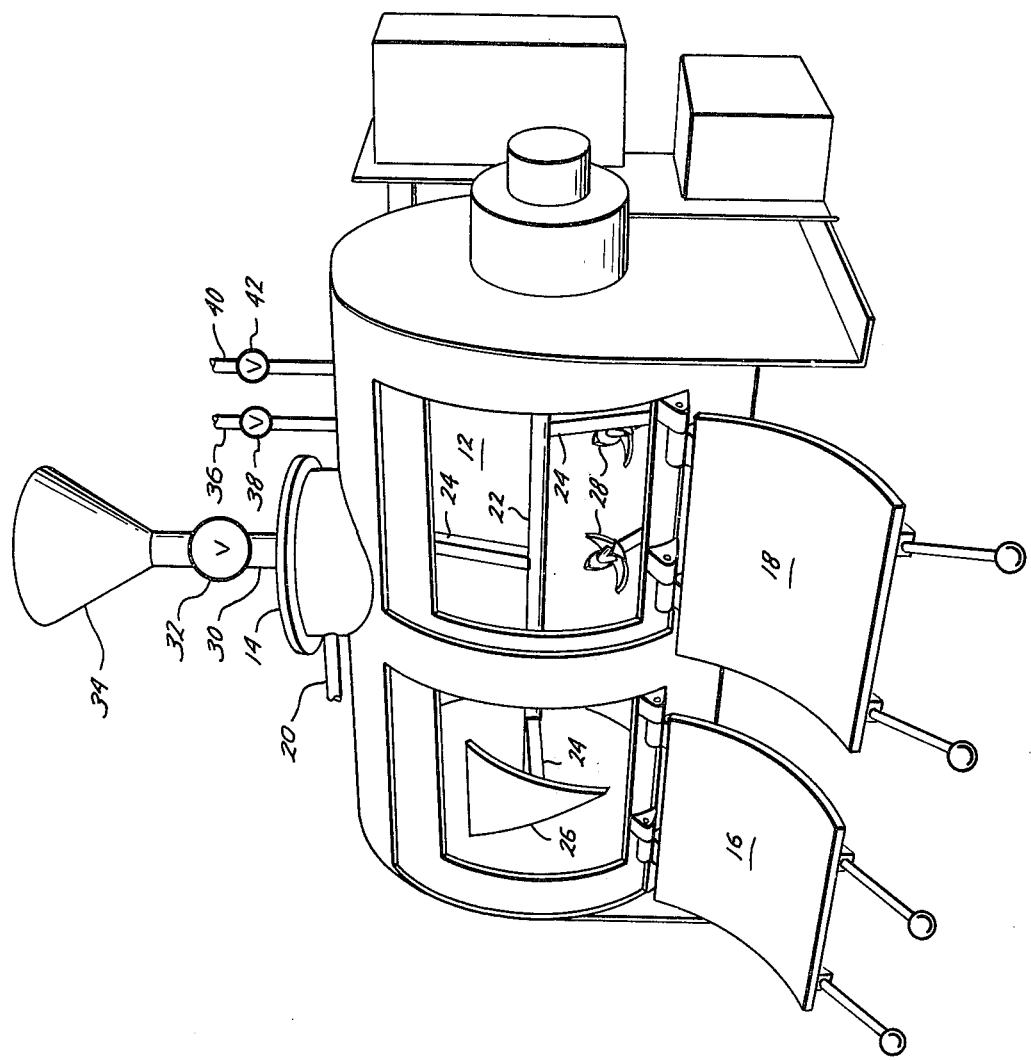

3,922,374

PREPARATION OF SIMULATED CHEESE

CROSS-REFERENCE TO RELATED APPLICATIONS

This is a continuation-in-part of U.S. Pat. application No. 344,640, now abandoned, filed Mar. 26, 1973 by the same inventors in Group Art Unit 172 for Non-Dairy Food Resembling Cheese and Processes For Making Same.

BACKGROUND OF THE INVENTION

The field of art to which the invention pertains is a non-dairy food product resembling cheese or, in other words, a non-dairy imitation cheese. The particular cheeses that are resembled are pasta filata, cheddar and pasteurized process American types.

The most pertinent prior art of which applicants are aware is the reduction to practice and commercial use of the subject matter of U.S. Pat. application Ser. No. 217,997, now abandoned, filed Jan. 14, 1972 in Group Art Unit 172 by John Dee Wynn, George Terrance Denton, Richard Judd Bell, Harry Rowe Vernon and Lloyd Roy Custer for Food Resembling Cheese and Process for Making Same, and of that application's s continuation-in-part application bearing the same name and filed June 10, 1974, but whose application serial number is yet unknown. Those applications are assigned to the same assignee as the present application. They disclose a non-dairy food resembling pasta filata or cheddar type cheese which is produced by a substantially gas-free homogeneous blend including an emulsion of fat and water, calcium caseinate, ungelatinized flour and certain acids. The blend is formed under high shear mixing at subatmospheric conditions.

Among the differences between the present invention and that of the earlier application is that the earlier application does not disclose the use of calcium caseinate or sodium caseinate formed in situ in the non-dairy food by any process, or the advantages thereof, or the use of sodium caseinate in any form in the non-dairy imitation cheese.

SUMMARY OF THE INVENTION

It is a general object of the present invention to provide a non-dairy food resembling pasta filata, cheddar or pasteurized process American type cheeses and processes of making the same utilizing calcium caseinate or sodium caseinate, or mixtures thereof, formed in situ. A more particular object of the present invention is to provide such a food which is less expensive than the real cheeses. The imitation cheeses of the present invention are particularly suitable for use in such dishes as enchiladas, pizzas, tacos, sandwiches, sauces and other prepared foods in place of ordinary cheeses.

Other and further objects, features and advantages will be apparent from the following description of the invention given for the purpose of disclosure.

The present invention is based upon the discovery that a food resembling pasta filata, cheddar or pasteurized process American type cheese can be economically prepared by forming a substantially gas-free homogeneous blend of (a) a fat having a Wiley melting point between about 90° and 110° F., the fat being about 12 to 35% of the food, (b) about 15 to 33% calcium caseinate, formed in situ by the process described later herein, or about 15 to 33% sodium caseinate formed in situ as described herein, or a combination of such caseinates, (c) up to about 5% ungelatinized flour, (d) about 0.5 to 1.8% adipic, lactic, citric, or malic acid, or combinations of such acids, and (e) water, the food having a pH of about 4.8 to 5.7 and including appropriate coloring and flavoring materials. In some instances, the ungelatinized flour may be omitted. All percentages herein are by weight.

In imitation cheddar type cheese, there is normally included up to about 2% emulsifying salts such as disodium phosphate and sodium aluminum phosphate.

"Substantially gas-free," as used herein, means that the product does not have air holes.

In practicing the method of the present invention, a sufficient amount of the blendings and reactions take place under subatmospheric conditions so that inclusion of gas in the product is prevented. The mixing is done under sufficient high shear conditions so that complete mixing after the addition or creation of the caseinate takes place quickly. If thorough mixing does not take place quickly, at least two harmful effects are created. One is that oil separation may occur. The second is that the product will often take on a "curdy" or "mealy" appearance rather than a homogeneous blend resembling cheese.

The fat is mixed with the other ingredients at a temperature above its melting point. In the manufacture of a mozzarella type imitation cheese using the in situ calcium caseinate process described herein, the mixing temperatures are important. At a temperature below about 145° F., oil separation is evident. Above about 180° F., the cheese takes on a curdy or mealy appearance and performs poorly when used on pizzas, i.e., has poor melting characteristics and a curdy appearance.

In application Ser. No. 217,997, it is stated that sodium caseinate is unsatisfactory as the protein in imitation cheese because an imitation mozzarella cheese using sodium caseinate instead of calcium caseinate burns and puffs when used on pizzas. However, applicants have determined that, while the commercially purchased sodium caseinates have been unsatisfactory, a sodium caseinate formed in situ is acceptable as the protein in imitation cheeses that are not exposed to heat. Additionally, in some uses, this in situ formed sodium caseinate is satisfactory in a heated imitation cheese such as in enchiladas where the cheese is in the interior of the product and/or is not exposed to the harsh conditions that cheese on a pizza receives.

Applicants have also determined that for some reason, not understood by them, some commercially available calcium caseinate does not perform satisfactorily in the product and processes of abandoned application Ser. No. 217,997. In overcoming this difficulty, they have developed a process for forming the calcium caseinate in situ, which even under the high solids contents here involved, yields a product that is more predictable, preferable and more economical than the use of purchased calcium caseinate.

BRIEF DESCRIPTION OF THE DRAWING

The drawing is a perspective view of the preferred high shear mixing vessel used in the process of the present invention.

DESCRIPTION OF THE PREFERRED EMBODIMENTS

The fat may be any of the edible fats used in shortenings or margarine having a melting point between 90° and 110° F. The preferred fat is refined, bleached and deodorized soybean oil hydrogenated to a melting point of about 95° F., with total fat being present in an amount equal to about 17 to 28% of the food.

The preferred ungelatinized flour is tapioca flour.

A product to properly resemble cheddar type cheese must have proper melt-down characteristics, and to resemble pasta filata type cheese, for example, mozzarella, must also have acceptable stringiness and/or breakdown. All three imitation cheeses need acceptable eating characteristics in cooked and uncooked conditions. To obtain the characteristics of the three types of cheeses here involved, it is necessary that in addition to the fat and the water, there also be included one of the in situ caseinates described herein and the particular acid or acids, and the pH must be controlled within the ranges specified. In some instances, if a non-stringy cheese with greater breakdown tendencies is desired, the ungelatinized flour may be omitted. The ungelatinized flour is used to aid in the firmness of the product which affects its sliceability and shredability. When ungelatinized flour is used, the amount is preferably between about 1 and 5% by weight of the food.

Either adipic, lactic, citric or malic acid, or combinations of those acids, must be included, but the exact chemical reason for this is not fully understood. They assist in the control of the pH range and to give proper firmness and melting qualities to the product when used on such materials as pizzas. The pH affects the flavor and the stringiness. If the pH is too high or too low, the food will not be stringy, and pasta filata type cheese normally should be. Also, the slightly acidic condition gives a desirable tart taste to the product. The preferred acid for pasta filata imitation cheese is adipic acid. The preferred amount of adipic acid in the imitation mozzarella type cheese is about 1.0%, in pasteurized process American type cheese is about 1.3%, and in imitation cheddar type cheese is about 0.8% by weight. Lactic acid in an amount of about 1.1 to 1.3% is preferred in pasteurized process American type cheese.

Imitation pasta filata cheese made with lactic acid, when compared to the same product using adipic acid, has about the same flavor, but has more tendency to crust and burn, has slightly inferior melting properties, has a greater tendency to curdiness, and is not as reliable in reproducibility.

Imitation cheeses made with citric or malic acid, when compared to the same products made with adipic or lactic acid, have a generally satisfactory flavor, but their other properties are not nearly as favorable, that is, there is much more tendency to crust and burn, more inferior melting properties, greater tendency to curdiness, and less reliability in reproducibility.

0.5 to 1.8% of either adipic, lactic, citric, malic acid, or combinations thereof, is required, and applicants are not aware of any other acid that can be substituted.

Another important use of the acid is, as explained later herein, to control the pH of the water which is blended with the casein to form calcium caseinate.

For mozzarella type imitation cheese, the pH of the product should be between about 5.1 to 5.5, with about 5.1 being preferred. With a food resembling cheddar cheese, the pH should be between about 4.8 and 5.7, with 5.1 being preferred. For a food resembling pasteurized process American type cheese, the pH should be between about 4.8 and 5.7, with about 5.3 being preferred.

In cheddar and pasteurized process American cheese, the inclusion of up to about 2% emulsifying salts aids in giving desired characteristics relating to melting, shredding, matting and texture. Particularly, they assist in the desirable flow of the melt of the cheese when it is heated on other foods. Preferably, about 0.25 to 1% disodium phosphate is used.

With the food products of the present invention, the preferred final moisture content of the food is approximately 45 to 49% of the final product. To be more exact, 45 ± 2% is preferred for the imitation pasteurized process American type, 47 ± 1% is preferred for the cheddar, and 48 ± 1% is preferred for the mozzarella. This moisture comes principally from the water added as such, but includes moisture in the other ingredients such as the casein.

The most satisfactory apparatus known to the applicants to carry out the high shear mixing used in the present invention are Littleford-Lodige high shear mixing vessels sold by Littleford Brothers, Inc., Cincinnati, Ohio, U.S.A., one of which is illustrated in the drawing attached hereto. The apparatus used by applicants are quite similar except for size. With this equipment, an operator is able to carry out sufficient high shear mixing under subatmospheric conditions that the product can be made, after formation of the caseinate, in less than 4 minutes, and preferably within 2 to 3 minutes.

Referring now to the drawing, the mixer includes a steam-jacketed cylindrical vessel 10 forming a generally horizontal cylindrical chamber 12 which is closed at both ends. A filling door 14 is on the top of the vessel and a discharging door, not shown, is at the bottom of the vessel 10 in line with the filling door 14. Access doors 16 and 18 allow easy access to and cleaning of the chamber 12. A vacuum line 20 communicates with the chamber 12 near the filling door 14. This vacuum line is connected with vacuum equipment, not shown, for producing a subatmospheric condition within the chamber 12.

An axle 22 extends along the axis of the chamber 12. Extending radially from axle 22 are a series of arms 24 on the outer end of each of which is a plow-shaped impeller (or mixing element) 26 contoured to fit the inner surface of the chamber 12. These plow-shaped impellers project material being mixed away from the inner surface of the chamber 12 and hurl it toward the axis of the chamber. Protruding from the lower wall of the vessel 10 and into the chamber 12 are a series of high speed blending choppers 28 which are so spaced between the arms 24 that neither those arms nor the plows 26 contact them. These choppers rotate at high speeds approximately 3600 r.p.m. to break up agglomerates. Both the axle 22 and the choppers 28 are driven by motors, not shown.

Protruding from the filler door 14 is a tubular conduit 30 controlled by a valve 32 which conduit connects with a supply container 34 so that various ingredients may be conveniently drawn under vacuum into the chamber 12. A conduit 36 with a valve 38 and another conduit 40 with a valve 42 each communicates with the chamber 12 near the top of the vessel 10. These conduits 36 and 40 are used as convenient means for introduction of fat and water into the chamber 12.

Example 1 illustrates the present invention using adipic acid and in which calcium caseinate is made in situ as a part of the process.

EXAMPLE 1.

An imitation mozzarella cheese was prepared from the following ingredients:

| Ingredients | Percent |
| --- | --- |
| Adipic acid | 1.00 |
| Water | 46.00 |
| Hydrochloric casein (80/90 mesh) | 28.00 |
| Calcium hydroxide | 1.08 |
| Dry ingredient blend | 2.29 |
| Soybean oil hydrogenated to a Wiley melting point of about 95° F. | 20.87 |
| Color-flavor blend comprising various colors, starters and imitation cream flavor | 0.19 |
| Lactic acid (88%) | 0.57 |

The dry ingredients blend, on percentages of the final imitation cheese, consisted of the following:

Dry Ingredient Blend

| Ingredients | Percent |
| --- | --- |
| Salt | 1.25 |
| Imitation parmesan flavor | 0.30 |
| Vitamin mix | 0.50 |
| Dipotassium phosphate | 0.14 |
| Sorbic acid | 0.10 |

In this example, the fat was heated to 160° ± 5° F. and the water to 170° ± 5° F. separately. Heat was applied to the steam jacket of the mixer to maintain a processing temperature of about 150° to 160° F. The adipic acid was added to the mixer through an access door and the water through line 36, and mixed for 10 seconds. A vacuum of 20 inches of mercury was pulled on the mixer and the casein drawn in through line 30 and mixed for 3 minutes to a doughy mass. The calcium hydroxide was then drawn in through line 30 and mixed for 60 seconds and thereafter the dry blend was drawn in and mixed for 90 seconds. Simultaneously, the melted fat was introduced through line 40 and the color-flavor blend and lactic acid through line 30 and mixed for 30 seconds. The mixer was stopped, the vacuum broken and the contents removed through the discharge door. The resulting product had 48 ± 1 % moisture. Its flavor was excellent, there was no separation, no foreign material, no lumps, no air voids, it was not curdled and on melting it had good breakdown characteristics.

The physical characteristics of the type of cheese which is being imitated determine the amount of moisture that can be in the final product, and, as a result, this limits the amount of water that can be used during the conversion of the casein to calcium caseinate by the reaction of the calcium hydroxide with the casein. Apparently because of the high solids content which exists at the time of this conversion, considerable difficulty was encountered by the applicants in developing an in situ process in which there was a rapid in situ formation of calcium caseinate. The applicants have found two conditions that are critical to this in situ process. One is the pH of the water which is mixed with the casein and the other is the mesh size of the powdered casein.

The isoelectric point of casein is a pH of about 4.6 (adjusted to 25° C.). For the casein to react with the calcium hydroxide to form calcium caseinate, it is necessary that the casein be mixed in as much water as possible under the moisture limitations on the final product. For some reason, which is unclear to applicants, they have been unable to develop this in situ conversion of the casein to calcium caseinate in the present process if the water in which the casein is mixed or blended is on the more basic side of the casein's isoelectric point. But applications have discovered that if the water is on the acidic side of the isoelectric point, in fact within the range of a ph of 2.5 to 3.5, then a satisfactory conversion of 80/90 mesh or smaller powdered casein will result. The adipic, lactic, citric or malic acid that is added will result in a pH of the water within the desired range, and in Example 1 given above, the pH of the adipic acid water solution was about 3.2. Applicants theorize that the use of the more acidic water may help to soften the granules of casein, but they are not certain of this.

For some reason, which also is unclear to applicants, if the casein powder is larger than about 80/90 mesh, they have been unable to satisfactorily carry out the present in situ calcium caseinate process using only calcium hydroxide as the source of calcium ions even though the casein is mixed with water having a pH below 3.5.

In Example 1 given above, the oil was added after the casein was converted, but, if desired, although it is not recommended, the oil may be added before the conversion of the casein.

Example 2 illustrates a process for the manufacture of a mozzarella type imitation cheese particularly suited for use in chili rellanos, including the in situ conversion of 30/40 mesh casein to calcium caseinate by the use of both calcium chloride and calcium hydroxide.

EXAMPLE 2.

| Ingredients | Percent |
| --- | --- |
| Adipic acid | 1.00 |
| Water | 43.55 |
| Hydrochloric casein | 25.00 |
| Calcium chloride | 0.60 |
| Calcium hydroxide | 0.74 |
| Soybean oil | 22.72 |
| Color-flavor blend | 0.29 |
| Dry ingredients blend | 6.10 |

In this example, the color-flavor blend and oil were the same as that in Example 1. The dry ingredients blend, on percentages of the final imitation cheese, consisted of the following:

Dry Ingredient Blend

| Ingredients | Percent |
| --- | --- |
| Salt | 1.00 |
| Imitation parmesan flavor | 0.60 |
| Vitamin mix | 0.50 |
| Tapioca flour | 2.94 |
| Potassium chloride | 0.51 |
| Amino acid | 0.31 |
| Dipotassium phosphate | 0.14 |
| Sorbic acid | 0.10 |

In this example, the fat and water were heated to the same temperatures as in Example 1. The adipic acid and then the water were added to the mixer and mixed for 10 seconds. A vacuum of 20 inches of mercury was pulled on the mixer, the casein was drawn in and mixed for 3 minutes. The calcium chloride was then drawn in and mixed for 60 seconds. Thereafter, the calcium hydroxide was drawn in and mixed for 60 seconds. The fat and color-flavor blends were drawn in simultaneously and blended for 30 seconds. Next, the dry blend was added and mixed for 90 seconds. The mixer was stopped, the vacuum broken and the product withdrawn through the discharge door. It had a moisture content of 46.3 ± 1%, flavor was good, there was no separation, no foreign material, no lumps, no air voids, and it had a resilient texture. It maintained its shape and was not runny, that is, no overmelting when used in the chili rellanos.

In this Example 2, the casein was 30/40 mesh and in order to have a satisfactory conversion of this size casein to calcium caseinate, it was found necessary to add calcium chloride in addition to calcium hydroxide to the blend of adipic acid, water and casein. Applicants have been unable to obtain in the present process a proper conversion using either the calcium chloride or calcium hydroxide alone with powdered casein having about a 30/40 or larger mesh size.

Example 3 illustrates the present invention forming an imitation cheddar flavor food by a process which includes the manufacture of sodium caseinate in situ.

EXAMPLE 3.

| Ingredients | Percent |
| --- | --- |
| Sodium hydroxide | 0.70 |
| Water | 44.49 |
| Hydrochloric casein | 25.00 |
| Hydrogenated soybean oil | 20.46 |
| Color-flavor blend | 0.50 |
| Dry ingredient blend | 8.85 |

The color-flavor blend was a mixture of imitation cream flavor, coloring and various flavors. The same oil was used as in Example 2. The dry ingredients blend consisted of the following materials with percentages given as percentages of the final food product.

| Dry Ingredient Blend | |
| --- | --- |
| Ingredients | Percent |
| Tapioca flour | 3.00 |
| Salt | 1.50 |
| Tricalcium phosphate | 1.50 |
| Adipic acid | 1.30 |
| Vitamin mix | 0.50 |
| White cheddar flavor | 0.50 |
| Amino acid | 0.31 |
| Dipotassium phosphate | 0.14 |
| Sorbic acid | 0.10 |

In this example, the fat and water were heated to 180° ± 5° F. and 190 ± 5° F. respectively. Sodium hydroxide and then the water was added to the mixer and mixed for 10 seconds. A vacuum of 20 inches of mercury was placed on the mixture, the casein was drawn in and mixed for 4 minutes to form a doughy mass. The fat and color blend were drawn into the mixer and mixed for 15 seconds. Next, the dry ingredients were drawn in and mixed for 30 to 45 seconds. The vacuum was broken and the product removed through the discharge door. The product was smooth, had a uniform color, no air voids, was free of lumps and streaks. Its moisture content was 47 ± 1%.

Forming in situ sodium caseinate is much easier than forming in situ calcium caseinate. For example, as shown by this Example 3, it is not necessary that the water be acidic before it is mixed with the casein. In fact, the sodium hydroxide may be added either before or after the addition of the oil.

Example 4 illustrates the production of a pasteurized process American type imitation cheese using both calcium caseinate and sodium caseinate formed in situ.

EXAMPLE 4.

| Ingredients | Percent |
| --- | --- |
| Adipic acid | 1.30 |
| Water | 45.20 |
| Hydrochloric casein (30/40 mesh w/fines) | 25.00 |
| Calcium hydroxide | 0.60 |
| Sodium hydroxide | 0.20 |
| Dry ingredient blend | 6.65 |
| Hydrogenated soybean oil | 20.60 |
| Color-flavor blend | 0.45 |

The contents of the dry ingredient mix, based upon percentages of the final food product were as follows:

| Dry Ingredient Blend | |
| --- | --- |
| Ingredient | Percent |
| Salt | 1.50 |
| Cheese flavor | 0.50 |
| Vitamin mix | 0.50 |
| Tapioca flour | 1.50 |
| Tricalcium phosphate | 1.10 |
| Disodium phosphate | 1.00 |
| Amino acid | 0.31 |
| Dipotassium phosphate | 0.14 |
| Sorbic acid | 0.10 |

The color-flavor blend consisted of small amounts of imitation cream flavor, coloring soybean salad oil, cheese flavor, and other flavors. The oil was the same as in Example 2.

In this example, the fat was heated to 160° ± 5° F., and the water to 170° ± 5° F. The adipic acid and nearly all (about 99%) of water were introduced to the mixer and mixed for 10 seconds. A vacuum of 20 inches of mercury was pulled on the mixer, the casein was drawn in and mixed for 3 minutes. For ease of introduction, the sodium hydroxide was dissolved in the remaining amount of water. The calcium hydroxide followed immediately by the sodium hydroxide solution were drawn into the mixer and mixed for 1 minute and 30 seconds. The dry blend was introduced into the mixer and mixed for 60 seconds. Thereafter, the fat and color blend were simultaneously drawn in and mixed for an additional 60 seconds. The mixer was stopped, the vacuum broken and the product removed. It had a moisture content of 46.2 ± 1%. Its flavor was good, there was no foreign material, no lumps and no air voids. It was smooth and creamy.

When a mixture of sodium and calcium hydroxides is used, a larger casein particle size of about 30/40 mesh is satisfactory. This is thought to be due to the fact that the in situ sodium caseinate conversion, which is done with relative ease, aids in the conversion of the calcium caseinate portion of the combined sodium-calcium caseinate conversion.

EXAMPLE 5.

This is an example using a mixture of adipic acid and lactic acid. In this instance, the ingredients were 46% water, 28% casein, 1.08% calcium hydroxide, 1.25% salt, 0.74% nutrients and preservatives, 0.19% artificial flavors and colors, 0.25% adipic acid, 1.25% lactic acid, and 21.07% hydrogenated soybean oil. The finished cheese had good texture, good handling characteristics and acceptable flavor and eating characteristics. When used on pizzas, it has a good appearance, very slight curdiness, excellent string, good flavor and good eating characteristics.

EXAMPLE 6.

The same cheese was made as in Example 5 except that 1.5% lactic acid was used in place of the mixture of lactic and adipic acids. The resulting cheese had good texture, good flavor, slightly mealy eating characteristics, slightly crumbling handling characteristics, good appearance on pizza with only slight curdiness, moderate string, good flavor and acceptable eating characteristics.

EXAMPLE 7.

This is an example using citric acid. In this instance, the imitation cheese was made from 46% water, 28% casein, 1.08% calcium hydroxide, 1.25% salt, 0.644% nutrients, 0.361% artificial coloring and flavoring, 0.10% sorbic acid, 21.815% hydrogenated soybean oil and 0.75% citric acid. The resulting cheese had good texture, good flavor, very slightly crumbling eating characteristics, very good handling performance, good appearance, no curdiness, very good string, good flavor and very good eating characteristics. Other tests showed that this 0.75% level of citric acid appeared to be the most preferred.

EXAMPLE 8.

This is an example using malic acid. The ingredients in this example and the quantity of those ingredients were the same as in Example 7 except that the fat content was 21.565% and instead of citric acid, 1.0% malic acid was used. The resulting cheese had good texture, good flavor, good eating characteristics, very good handling performance, slightly slow melt, very slight curdiness, fair string, good flavor and good eating characteristics. Increasing the amount of malic acid reduced the quality of the finished product, but combining malic and lactic acid improved the product.

In all the examples given herein, the amount of caseinate is within the preferred range which is approximately 24 to 30% of the final food. The amount of calcium hydroxide, calcium chloride and sodium hydroxide used to create the caseinates is preferably approximately the stoichiometric amount necessary to convert all the casein to the calcium or sodium caseinates.

From the foregoing discussion, examples and description of the invention, it is apparent that the objects set forth herein as well as others have been achieved. Those skilled in the art will recognize that the principles of this invention may be applied in several ways, only a few of which have been exemplified here specifically.

What is claimed is:

1. A process for making a food having a final moisture content between about 45 and 49%, a pH of about 4.8 to 5.7 and resembling cheese selected from the class consisting of pasta filata, cheddar and pasteurized process American type, said process comprising,
   a. forming an aqueous solution of an acid selected from the class consisting of adipic, lactic, citric, malic and combinations thereof, the solution having a pH between about 2.5 and 3.5, the amount of acid being between about 0.5 and 1.8% of the food, the water in the aqueous solution and in other ingredients present in the food being sufficient to give the food said final moisture content,
   b. mixing the aqueous solution of acid with powdered casein no larger than about 80/90 mesh, the amount of casein being such that the caseinate formed in step (c) is between about 15 and 33% of the food,
   c. mixing and reacting calcium hydroxide with the product of step (b) under high shear mixing and subatmospheric pressure thereby forming calcium caseinate, the calcium hydroxide being approximately the stoichiometric amount to react with the casein, and thereafter
   d. mixing between about 12 and 35% fat above its melting point with the product of step (c) under high shear mixing and subatmospheric pressure, the fat having a Wiley melting point between about 90° and 110° F., to form said food as a substantially gas-free homogeneous blend of the various ingredients, steps (c) and (d) being in either order.

2. The process of claim 1 in which the solution in step (a) includes adipic acid.

3. The process of claim 1 in which step (d) takes place in less than about 4 minutes.

4. A process for making a food having a final moisture content between about 45 and 49%, a ph of about 4.8 to 5.7 and resembling cheese selected from the class consisting of pasta filata, cheddar and pasteurized process American types, said process comprising,
   a. forming an aqueous solution of an acid selected from the class consisting of adipic, lactic, citric, malic and combinations thereof, the solution having a pH between about 2.5 and 3.5, the amount of acid being between about 0.5 and 1.8% of the food, the water in the aqueous solution and in other ingredients present in the food being sufficient to give the food said final moisture content,
   b. mixing the aqueous solution of acid with powdered casein, the amount of casein being such that the caseinate formed in step (c) is between about 15 and 33% of the food,
   c. mixing and reacting calcium chloride and calcium hydroxide with the product of step (b) under high shear mixing and subatmospheric pressure thereby forming calcium caseinate, the amount of calcium chloride and calcium hydroxide being approximately sufficient to supply the stoichiometric amount of calcium ions to react with the casein, and thereafter
   d. mixing between about 12 and 35% fat above itse melting point with the product of step (c) under high shear mixing and subatmospheric pressure, said fat having a Wiley melting point between about 90° and 110° F. to form said food as a substantially gas-free homogeneous blend of the various ingredients.

5. The process of claim 4 in which the solution in step (a) includes adipic acid.

6. A process for making a food having a final moisture content between about 45 and 49%, a pH of about 4.8 to 5.7 and resembling cheese selected from the class consisting of pasta filata, cheddar and pasteurized process American types, said process comprising, a. forming an aqueous solution of an acid selected from the class consisting of adipic, lactic, citric, malic and combinations thereof, the solution having a pH between about 2.5 and 3.5, the amount of acid being between about 0.5 and 1.8%, the water in the aqueous solution and in other ingredients present in the food being sufficient to give the food said final moisture content, b. mixing the aqueous solution of acid with powdered casein no larger than about 30/40 mesh, the amount of casein being such that the caseinates formed in step (c) are between about 15 and 33% of the food, c. mixing and reacting calcium hydroxide and sodium hydroxide with the product of step (b) under high shear mixing and subatmospheric pressure thereby forming calcium caseinate and sodium caseinate, the amount of calcium hydroxide and sodium hydroxide being sufficient to supply approximately the stoichiometric amount of calcium and sodium ions to react with the casein, and thereafter d. mixing between about 12 and 35% fat above its melting point with the product of step (c) under high shear mixing and subatmospheric pressure, said fat having a Wiley melting point between about 90° and 110° F. to form said food as a substantially gas-free homogeneous blend of the various ingredients.

7. The process of claim 6 in which the solution in step (a) includes adipic acid.

8. The process of claim 6 in which step (d) takes place in less than about 4 minutes.

9. A process for making a food having a final moisture content between about 45 and 49%, a pH of about 4.8 to 5.7 and resembling cheese selected from the class consisting of pasta filata, cheddar and pasteurized process American types, said process comprising, a. reacting an aqueous solution of sodium hydroxide and casein under high shear mixing and subatmospheric pressure to form sodium caseinate, the water in the aqueous solution and in other ingredients present in the food being sufficient to give the food said final moisture content, the amount of casein being such that, when converted to sodium caseinate, the sodium caseinate is between about 15 and 33% of the food, and the sodium hydroxide being approximately sufficient to supply the stoichiometric amount of sodium ions to react with the casein and thereafter b. mixing a fat above its melting point and an acid selected from the class consisting of adipic, lactic, citric, malic and combinations thereof with the product of step (a) under high shear mixing and subatmospheric pressure to form said food as a substantially gas-free homogeneous blend of the various ingredients, said fat having a Wiley melting point between about 90° and 110° F. and being between about 17 and 28% of the food, the acid being between about 0.5 and 1.8% of the food, and the mixing of the ingredients in steps (a) and (b) taking place in any order.

* * * * *